United States Patent [19]

Bucska

[11] Patent Number: 5,790,332
[45] Date of Patent: Aug. 4, 1998

[54] METHOD AND APPARATUS FOR GENERATING CLOCK SIGNALS HAVING COUNT CLOSURE AND DETERMINISTICALLY OPTIMIZED PHASE CLOSURE

[75] Inventor: Nicholas J. Bucska, Longmont, Colo.

[73] Assignee: PC Peripherals Inc., Broomfield, Colo.

[21] Appl. No.: 554,783

[22] Filed: Nov. 7, 1995

[51] Int. Cl.[6] ............................................. G11B 5/09
[52] U.S. Cl. ........................................ 360/51; 360/53
[58] Field of Search ................................. 360/51, 53, 75,
360/39, 48; 369/48, 50, 54; 375/376, 324,
344, 368; 331/2, 25; 364/481; 329/302;
386/68, 96, 104, 113, 76, 106, 40, 86

[56] References Cited

U.S. PATENT DOCUMENTS

| | | | |
|---|---|---|---|
| Re. 34,317 | 7/1993 | Ikea | 331/25 |
| 2,926,341 | 2/1960 | Scarbrough | 360/51 |
| 3,531,787 | 9/1970 | Fuller | 360/51 |
| 4,930,142 | 5/1990 | Whiting et al. | 375/376 |
| 4,996,608 | 2/1991 | Widney | 360/51 |
| 5,115,358 | 5/1992 | Widney | 360/75 |
| 5,172,357 | 12/1992 | Taguchi | 369/48 |
| 5,321,560 | 6/1994 | Cowen | 360/48 |
| 5,329,251 | 7/1994 | Llewellyn | 331/2 |

*Primary Examiner*—Aristotelis M. Psitos
*Assistant Examiner*—Patrick Wamsley
*Attorney, Agent, or Firm*—Sheridan Ross P.C.

[57] ABSTRACT

The present invention discloses an apparatus and method for generating clock signals recorded along a track of a rotating disk storage system, wherein the recorded clock signals have count closure and/or phase closure. In one aspect, a clock generation circuit records a temporary clock track on a disk, senses information about the temporary clock track, and uses the sensed information to determine parameters relating to a frequency for a clock signal that will provide count closure and/or phase closure when the clock signal is written along a track on the disk.

21 Claims, 3 Drawing Sheets

METHOD AND APPARATUS FOR GENERATING CLOCK SIGNALS HAVING COUNT CLOSURE AND DETERMINISTICALLY OPTIMIZED PHASE CLOSURE

FIELD OF THE INVENTION

The present invention relates generally to the field of servo track writing systems and, more particularly, to systems for generating a clock signal on a rotating disk.

BACKGROUND OF THE INVENTION

Disk storage systems include at least one rotating disk and a read-write head that writes data along concentric tracks on the disk. A servo track writing system records servo signals along every clock track on at least one of the disks. During the recording of the servo signals, a track is used to accurately position the servo signals along the tracks. As the storage capacity of disk storage systems increases, it is becoming increasingly more important for the clock signals to be accurately recorded along the clock track in order to provide accurate positioning of the servo signals on the tracks.

The clock track typically includes an index (e.g., a DC erased gap) followed by clock pulses having a predetermined frequency. The index provides a physical reference point on the disk. The angular position of the head is determined by sensing the index and thereafter counting clock pulses until the index is again sensed, indicating a full revolution of the disk. Consequently, it is important that the clock track have exactly a predetermined number of clock pulses. This requirement is referred to as "count closure." Furthermore, it is important that the phase error between the last clock transition and the first clock transition in a clock track be within acceptable limits. This requirement is referred to as "phase closure."

The clock signal is generated and written along the clock track by clock generation circuitry. The clock generation circuitry is typically part of the servo track writer apparatus that writes the clock track and servo data on the disk before or after the disk is assembled within the disk storage system. The clock generation circuitry generally includes an oscillator, read-write circuitry, and a clock read-write head that is fixedly positioned over a designated clock track on the disk. The oscillator generates an alternating signal having a predetermined frequency that is converted into a clock signal by the read-write circuitry and written along a clock track on the disk by the clock read/write head.

Although known oscillators can provide a substantially constant frequency clock signal, it is difficult to achieve count closure and very difficult to achieve phase closure due to variations in the disk speed. Even a momentary slight variation in disk speed will modulate the clock signal recorded onto the disk and cause the resulting clock track to have an incorrect number of clock pulses or an incorrect gap length (i.e., neither count closure nor phase closure).

Some known clock generation circuits attempt to reach count and phase closure through a trial and error process. These clock generators first write a temporary clock track on the disk. Next, the number of cycles is counted and compared to a desired number of clock cycles to determine the count closure error, if any, and the time between clock pulses at the end and the beginning of the temporary clock track is measured to determine the phase closure error. If there is a count closure error or if the phase closure error exceeds a predetermined range (usually 10–50 nsec) then the clock track is rewritten with a varied disk speed and/or varied clock frequency until acceptable phase and count closures are achieved. Often, these clock generators will rewrite the clock track a few hundred times before acceptable count and phase closures are achieved. The limitations of these known clock generation circuits become particularly acute for high density storage systems where an accurate high frequency clock track is required or when the system has relatively poor disk speed regulation.

SUMMARY OF THE INVENTION

The present invention provides an improved clock generation circuit for generating a clock signal along a track on a rotating disk. In particular, the clock generation circuit of the present invention generates a clock track having count closure and phase closure in a predictable and short time. The present invention provides count closure and phase closure by recording a first clock track on the disk, sensing information about the first clock track, and then using the sensed information to calculate parameters for a frequency of a second clock signal that will provide an acceptable count and phase closure when the clock signal is written along a track on the disk.

The various aspects of the present invention are embodied in a clock generation circuit that includes a controller, a frequency source, and read-write circuitry. The controller determines information from clock signals that have been read from the disk and calculates parameters for a clock frequency that will provide simultaneous count closure and phase closure within a predetermined range when the clock signal having the calculated frequency is written on the disk. The parameters for the clock frequency can alternatively be calculated to independently provide count closure or phase closure. The frequency source includes a frequency synthesizer that generates signals having a frequency that is selectable from a predetermined range of frequencies, with the frequency of the generated signals being selected by the controller. In one embodiment, the frequency source includes a voltage controlled oscillator (VCO) that receives an input signal and generates, therefrom, an output signal having a frequency which is generally a non-integer multiple of the input signal.

The alternating signals generated from the frequency source are provided to the read-write circuitry for writing as a clock signal along a track on the disk. The read-write circuitry includes two or more read-write heads. The read-write heads can include a data read-write head for writing temporary clock tracks and a dedicated clock head for writing a final clock track.

The controller commands the frequency source to generate a first clock signal having an index signal, preferably a DC erased gap, that is written along a first clock track on the disk by the read-write circuitry. The number of clock pulses and the length of the DC-erased gap that are recorded in the first clock track depend upon the frequency of the first clock signal, the disk speed, and the variation in disk speed. The clock signal recorded in the first clock track is read from the disk using the read-write circuitry and analyzed by the controller to determine the number of clock pulses and the length of the gap in the first clock track. The controller then calculates parameters for controlling the frequency of a second output signal generated by the frequency source to provide count closure and an acceptable phase closure in a second clock track that is formed using the first output signal while the second output signal from the frequency source is phase locked to the first clock track.

In one embodiment, the controller calculates a first and a second parameter that are used to switch the frequency source's second output frequency between a first frequency that is an exact multiple of the actual frequency of the alternating signals written in the first clock track and a second output frequency used for at least one clock cycle of the output signal that provides an acceptable phase error at closure of the first clock track when the frequency source is phase locked to the alternating portion of the first clock track and encounters the first clock pulse following the gap of the first clock track. In this manner, the frequency source's first output signal runs at a constant frequency relative to the disk speed. Since, the first output signal's frequency is usually a non-integer multiple of the desired final frequency for the second clock track, the frequency source's first output signal is provided to a frequency synthesizer (e.g., a numerically controlled oscillator) which provides a signal having the desired final frequency which is written in the second clock track, with or without an index/gap signal. In this manner, count closure and phase closure within a predetermined range are achieved in the clock signal recorded along the second clock track.

In a further embodiment, the controller reduces the variation in the disk speed while the first clock track and/or the second clock track are being written. In particular, the controller writes a preliminary clock track using a clock signal from the frequency source. The clock signal is read from the preliminary clock track and the disk speed is controlled relative to the clock signal to reduce the variation in the disk speed. The first clock track is written while the disk speed is controlled relative to the preliminary clock track to provide less frequency modulation of the clock signal due to variations in the disk speed than could otherwise be provided. Similarly, the disk speed can be controlled relative to the first clock track while the second clock track is being written on the disk to improve the accuracy of the second clock track.

BRIEF DESCRIPTION OF THE DRAWINGS

For a more complete understanding of the present invention and further advantages thereof, reference is now made to the following Detailed Description, taken in conjunction with the Drawings, in which.

DETAILED DESCRIPTION OF THE INVENTION

Figure 1:
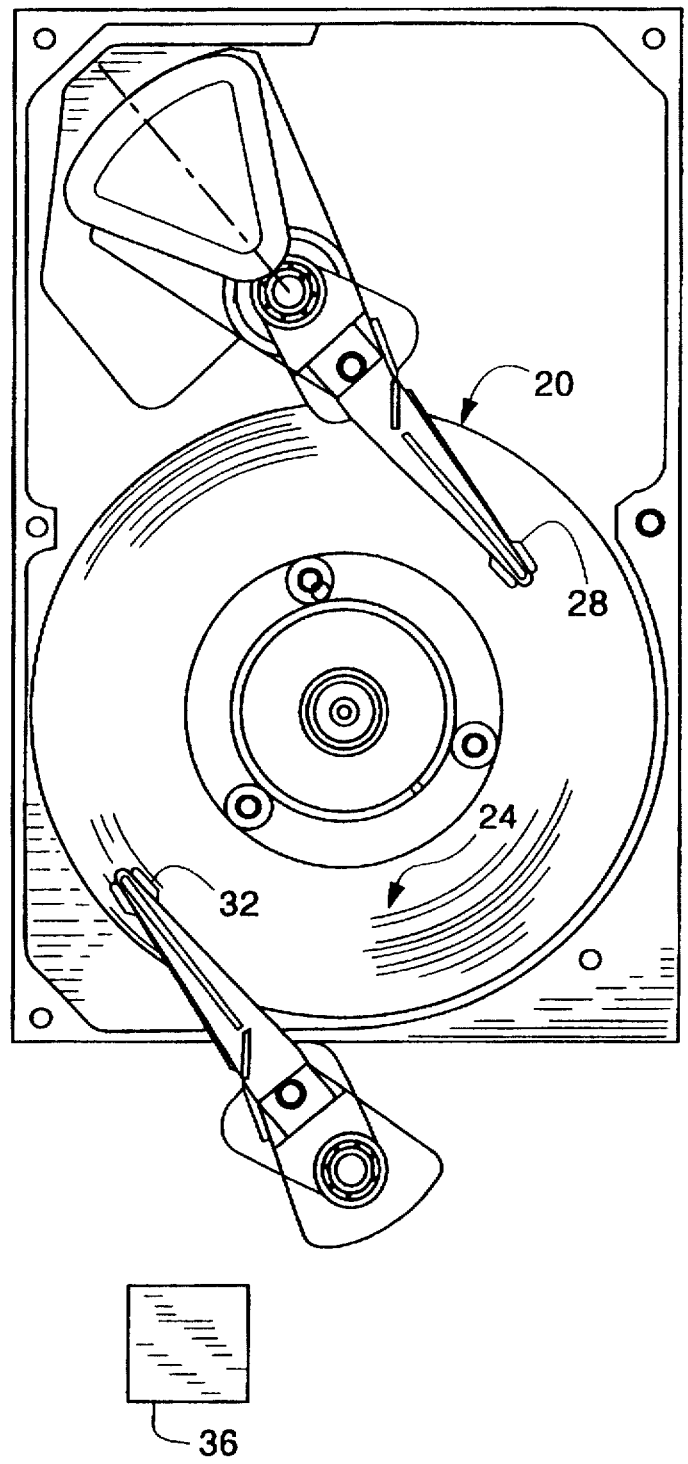
FIG. 1 is a top view of a magnetic disk storage system according to the present invention.

A servo track writer system is illustrated in FIG. 1 that includes a clock head 32 and a clock generation circuit 36 which are operatively coupled to a disk 20 having a plurality of tracks 24 and a data head 28. The data head 28 is radially positioned over a selected track for reading or writing data, servo, or clock information on the disk 20. The clock head 32 is fixedly positioned over a dedicated clock track on the disk and is optimized for writing clock information.

The clock generation circuit 36 according to the present invention generates a clock track on the disk 20 having count closure and phase closure. Advantageously, the clock generation circuit 36 can simultaneously provide both count closure and phase closure. The clock generation circuit 36 writes a first clock track, shown as 38 in FIG. 2, onto the disk 20. The number of clock pulses and the time between clock pulses at the end and the beginning of the first clock track 38 depend upon the frequency of the written clock signal, the disk speed, and the variation in the disk speed. The first clock track 38 has neither count closure (i.e., incorrect number of clock pulses) nor phase closure (i.e., incorrect length of the gap). The clock generation circuit 36 obtains information about the first clock track 38 and then determines parameters for a frequency of a clock signal that, when written along a second clock track on the disk 20, provides an acceptable count closure and/or phase closure. The clock generation circuit 36 further improves the written clock track by reducing the variation in the disk speed while the first and/or second clock tracks are being written.

Figure 3:
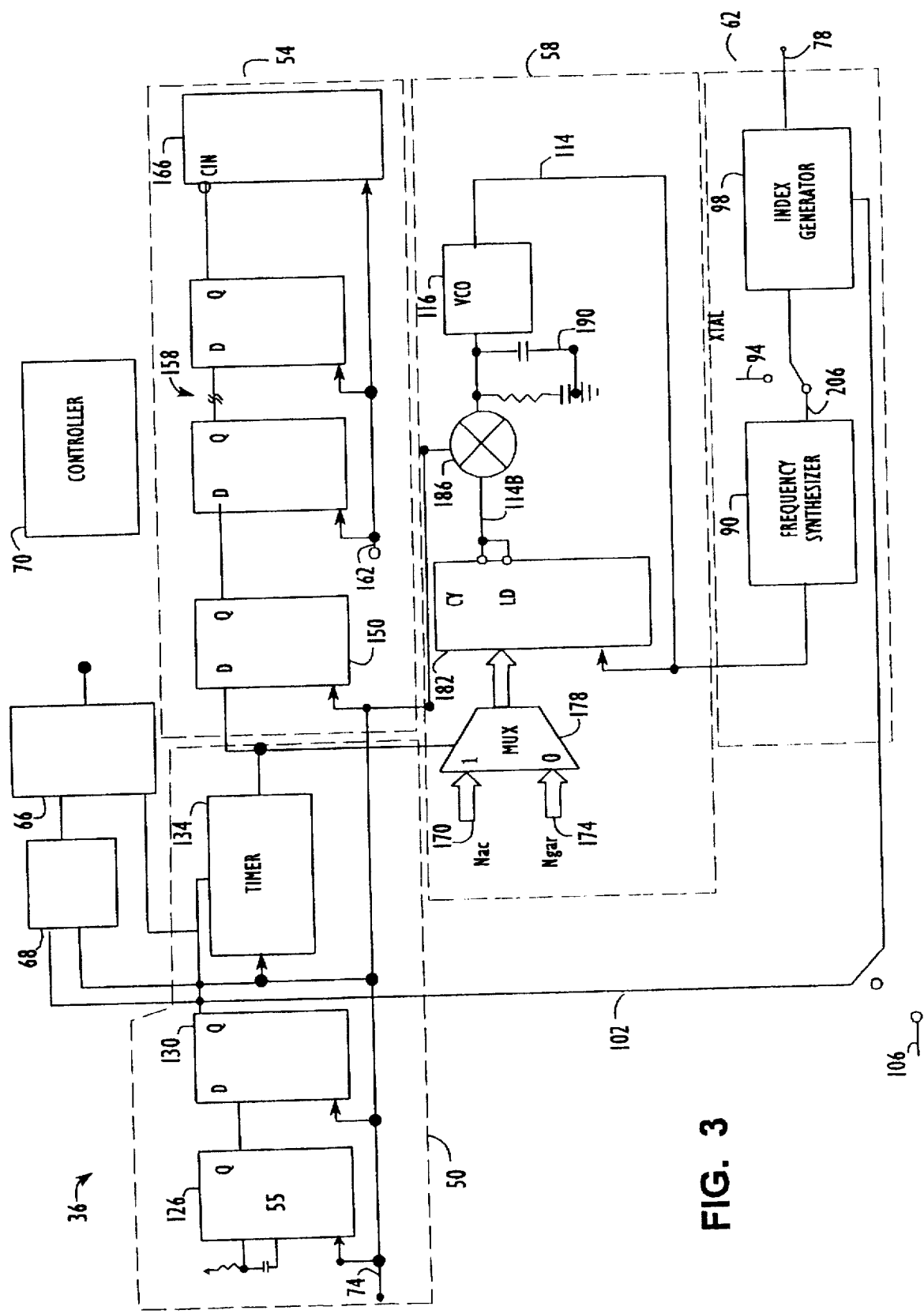
FIG. 3 is a block diagram of a clock generator system according to the present invention.

An embodiment of the clock generation circuit 36 according to the present invention is shown in FIG. 3. The circuit 36 includes a gap detector 50, a gap length measuring circuit 54, a phase lock loop (PLL) 58, a write data generator 62, a spin controller 66 and associated spin counter 68, and a controller 70. The clock circuit 36 receives signals that have been read from the disk through line 74 and provides signals that are to be written onto the disk through line 78.

Figure 2:
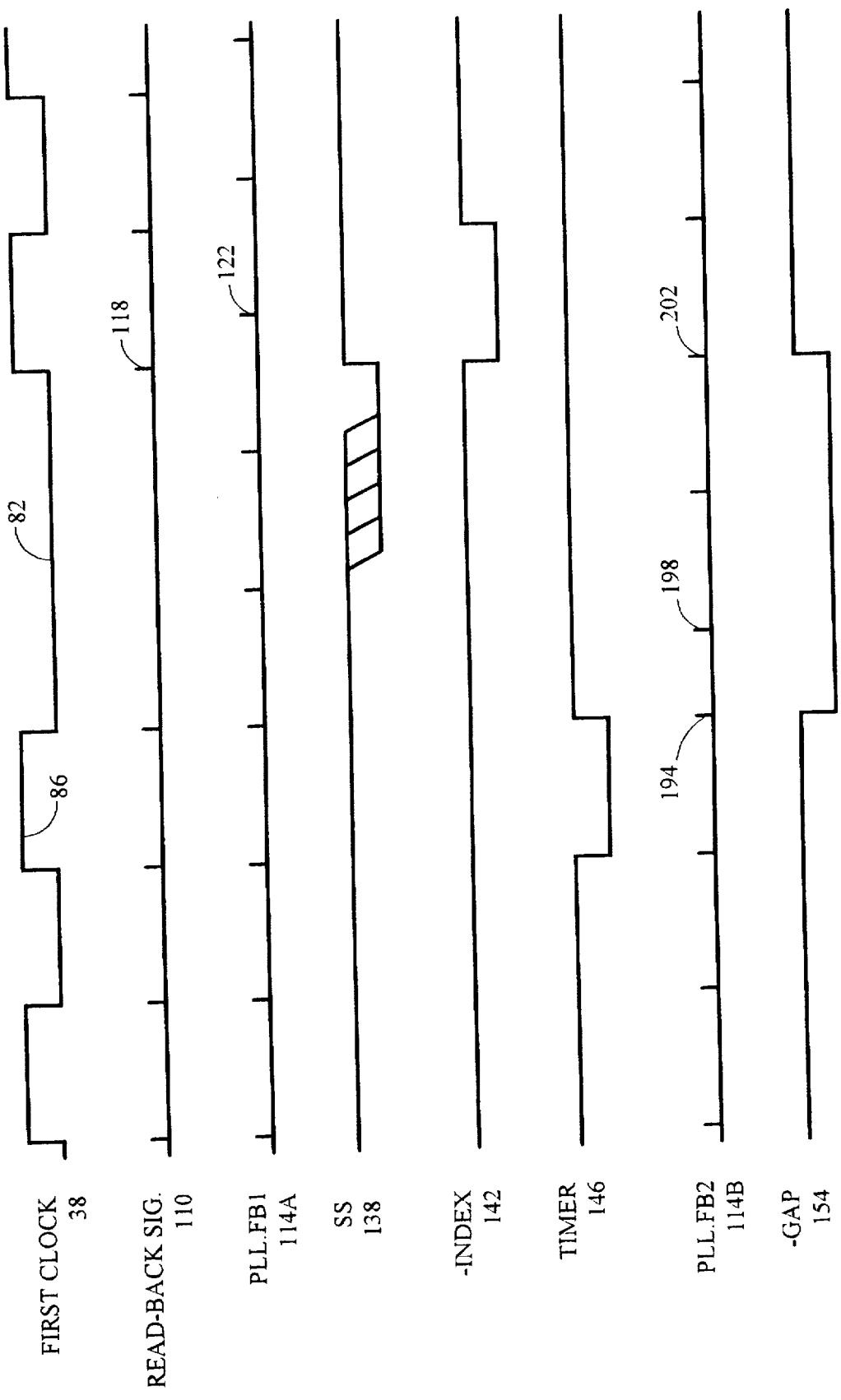
FIG. 2 illustrates clock signals according to the present invention.

The clock generation circuit 36 uses the write data generator 62 to write the first clock track 38 with a DC gap 82 followed by an integer number of cycles of square waves 86, as shown in FIG. 2. The write data generator 62 includes a frequency synthesizer 90, a switched input XTAL 94 for receiving a fixed frequency from an external frequency source, and an index generator 98 that is triggered by either an index signal provided from the gap detector 50 by the line 102 or by an index signal provided by the switched index input 106. The controller 70 regulates the index generator 98 via the index input 106 to write the DC erased gap 82 on the first clock track 38. The DC erased gap 82 is written with a sufficient length to be detectable by the gap detector 50 when the written DC erased gap 82 includes jitter between the gap 82 and the adjacent square waves 86 due to disk speed variation. The square waves 86 are written using a fixed frequency signal that is derived from a crystal or a spin motor position sensor, as is well known in the art, or from a track that has been previously written on the disk 20 and which is provided to the write data generator 62 via the switched input of the index generator 98.

The first clock track 38 is read from the disk 20 to provide a first read-back signal, 110 in FIG. 2, that is provided to the clock generation circuit 36 via line 74. The PLL 58 is locked to twice the frequency of the first clock track 38, due to the first read-back signal 110 having pulses on both edges of the square waves 86. The feed-back signal, 114A, in the prior art generated by the PLL 58 has feed-back pulses that are substantially aligned with the pulses in the read-back signal before the gap 82. The PLL 58 is operated in a harmonic mode and locked to the read-back signal 110, so that the feed-back pulses for the PLL 58 do not generate a phase error due to the missing pulses in the read-back signal 110 during the gap 82. The phase closure error in the prior art is illustrated in FIG. 2 by the misalignment, and associated time interval, between the first read-back pulse 118 and the first feed-back pulse 122 after the DC erased gap 82.

As described below, the clock generation circuit 36 uses the first clock track 38 to provide a second clock track that simultaneously provides clock closure and an acceptable phase closure (i.e., removal of the phase closure error illustrated in FIG. 2). As a first step, the gap detector 50 develops an index pulse that follows the DC erase gap 82 in the first clock track 38. The gap detector 50 includes a retriggerable single-shot timer (SS timer) 126, a D-type flip-flop 130, and a timer 134. The SS timer 126 is kept triggered, with a corresponding logic-high output, by the pulses in the read-back signal 110 and becomes untriggered, with a corresponding logic-low output, when the retriggerable SS 126 times out somewhere within the DC erase gap 82, shown as signal SS 138 in FIG. 2.

The output signal 138 of the SS timer 126 is reclocked by the D-type flip-flop 130 to cause the signal-INDEX 142 on line 102 to be aligned with the end of the gap 82 by delaying the signal-INDEX 142 a predetermined time using the timer 134. The D-type flip-flop 130 and the timer 134 form a sequential circuit that is functionally equivalent to an N bit shift register, where N is the length of desired delay. The timer 134 can be an INTEL 8254 timer programmed to operate in MODE 5 or its functional equivalent.

The controller 70 determines the number of clock cycles written in the first clock track 38 by counting the clock cycles as they are written or counting the number of pulses in the read-back signal 110 from the first clock track 38. The controller 70 uses the number of written clock cycles to program the timer 134 to delay its output pulse, shown as signal TIMER 146 in FIG. 2, until the end of the clock cycles in the first clock track 38, resulting in an output signal having a rising edge which anticipates the DC erased gap 82.

The output signal from the timer 134 is used to control the gap length measuring circuit 54 to measure the length of the DC erase gap 82. In particular, the output signal from the timer 134 is passed through a D-type flip-flop 150 where it is reclocked by the read-back signal 110 before the DC erased gap 82. To prevent any metastability, the output of the D-type flip-flop 150, shown as signal-GAP 154 in FIG. 2, is reclocked in the a multi-stage shift register 158 (e.g., 2 to four sequentially coupled D-type flip-flops) with a high frequency clock 162, preferably having frequency of at least 500 MHZ to provide sufficient accuracy in measuring the length of the DC-erased gap 82. The output of the multi-stage shift register 158 is used to enable the counter 166 to start and stop counting the high frequency clock cycles 162, where the number of counted clock cycles represents the length of the gap 82. The length of the gap 82 is measured and averaged for several revolutions of the disk 20 by the counter 166 (e.g. a MC10E016 type IC) in order to provide sub-nanosecond resolution in the length measurement.

After counting the number of clock cycles written in the first clock track 28 and measuring the length of the gap 82, the controller 70 calculates the actual frequency for the AC portion (square waves 86) written on the first clock track 38 using a nominal disk speed. The controller 70 then calculates parameters, first 170 and second 174 parameters, for controlling the PLL 58 to generate an output signal having phase closure.

The PLL 58 uses a feedback loop comprising a counter 182, a phase detector 186, a filter 190, and the VCO 116 to generate feedback signal, shown as PLL.FB2 114B in FIG.2, in the PLL 58 having phase closure with the first read-back pulse 118 after the DC erased gap 82 of the first clock track 38. As described below, phase closure is provided by the counter 182 selectively dividing the feedback signal, PLL.FB2 114B, in the PLL 58 by the two calculated parameters 170 and 174.

The output of the counter 182 is compared by the phase detector 186 with the read-back signal 110 from the first clock track 38, then filtered 190, and provided to the VCO 116. The signal TIMER 146 output by the timer 134 is used to select which of the two calculated parameters are loaded into the counter 182 and, thereby, to switch the frequency of the feedback signal, PLL.FB2 114B. As previously described, the signal TIMER 146 from the timer 134 anticipates the gap 82 in that it overlaps the last pulse of the AC portion of the read-back signal 110 which is the leading edge of the gap 82. The two parameters 170 and 174 are multiplexed to the divider 182 by a multiplexer 178 that is controlled by the signal TIMER 146. In particular, the signal TIMER 146, causes the multiplexer 178 to swap parameters 170 and 174 in the divider 182 in order to generate a different period between pulse 194 and pulse 198 in the signal PLL.FB2 114B.

In this manner, the time between the pulses 194 and 198 can be adjusted larger or smaller than the time between the other pulses in the signal PLL.FB2 114B. Consequently, the pulse 202 is made substantially aligned with the beginning of the AC portion 118 of the first clock track 38. The alignment between the pulses 202 and 118 is generally within one half of an output cycle of the VCO 116, and can be further improved by selecting the parameters 170 and 174 to provide an output signal frequency from the VCO 116 that minimizes misalignment between the pulses 202 and 118 and/or by providing a higher frequency clock signal from the VCO 116. In this manner, the signal PLL.FB2 114B provides a very small phase error within an acceptable range for phase closure and a predetermined number of VCO output signal 114 cycles per revolution of the disk 20.

The write data generator 62 generates a signal having the desired frequency for the second clock track by providing the VCO output signal 114 to the frequency synthesizer 90 where the frequency of the signal 114 is divided by a number calculated by the controller 70 to provide count closure in v the second clock track. Generally, the dividing number is a non-integer value since the VCO output signal 114 is generally a non-integer multiple of the desired signal frequency for the second clock track. Preferably, the frequency synthesizer 90 comprises a numerically controlled oscillator with a 32 bit resolution for generating an output frequency that is accurate within one part in at least four billion . The divided signal is output on line 206 to the index generator 98 for writing along the second clock track on the disk 20. The second clock track can be written with or without an index from the index generator 98.

In a further aspect of the present invention, the speed variations of the disk are reduced while the first and/or second clock tracks are written in order to reduce the frequency modulation in the written clock signals and to thereby improve the accuracy of the clock tracks. In one embodiment, a, preliminary clock track is written before the first clock track. The preliminary clock track generates a read-back signal that is divided by the spin counter 68 which is reset by an index in the preliminary clock track to provide between about ten to several hundred spin sense pulses per revolution of the disk 20. The spin sense pulses are provided to the spin controller 66. The spin controller 66 regulates the speed of the disk by comparing the spin sense pulses with fixed frequency reference pulses.

In one embodiment, the spin controller 66 measures the relative position of each of the spin sense pulses and compensates for the repeating part of the phase error, caused by the spin variation written into the preliminary track, by reprogramming the counter generating the reference pulses to adjust the phase of each individual spin sense pulse. In another embodiment, the spin controller 66 phase locks the disk motor to the reference pulses and uses the difference between the average and instantaneous phase errors between each of the spin sense pulses and the reference pulses as error input to the phase lock loop to reduce variations in the data frequency.

The foregoing discussion has been presented for purposes of illustration and description. Further, the description is not intended to limit the invention to the form disclosed herein. Variation and modification commensurate with the above teachings, within the skill and knowledge of the relevant art, are within the scope of the present invention. The embodiments described herein above are further intended to explain the best modes presently known of practicing the invention and to enable others skilled in the art to utilize the invention as presented, or in other embodiments, and with the various modifications required by their particular applications or uses of the invention. It is intended that the appended claims be construed to include alternative embodiments to the extent permitted by the prior art.

What is claimed is:

1. A clock generator for generating an accurate clock track along a rotating disk, comprising:

means for writing a first clock track along the disk using a clock signal having a first alternating signal and a first index signal related to a DC erased gap having an end;

means for reading said first clock track to provide a first read-back clock signal including one pulse that is adjacent to said end of said DC erased gap;

means for obtaining information about said first read-back clock signal;

means for producing a controlled oscillator signal phase locked to said first alternating signal, means for outputting a controlled oscillator feedback signal having one pulse that is adjacent to said end of said DC erased gap;

means for generating a second clock signal, having a frequency, from said controlled oscillator signal;

means for writing a second clock track on the disk using said second clock signal to obtain count closure; and means for determining, using said information about said first read-back clock signal, at least a first parameter that is determined to minimize the time difference between said one pulse of said first read-back clock signal and said one pulse of said controlled oscillator feedback signal, said first parameter being determined independently of said frequency of said second clock signal and before said second clock track having count closure is written using said second clock signal means.

2. The clock generator of claim 1, further comprising:

disk speed regulation means for reducing variations in the disk speed while at least one of said means for writing a first clock track and said means for writing a second clock track are writing said first and second clock tracks, respectively, on the disk.

3. The clock generator of claim 2, wherein said disk speed regulation means comprises:

means for writing a preliminary clock track on the disk using a clock signal;

means for reading said preliminary clock track on the disk to provide a preliminary read-back clock signal; and means for controlling the disk speed using the phase of said preliminary read-back clock signal relative to a reference signal to reduce variations in the disk speed.

4. The clock generator of claim 3, wherein said disk speed regulation means further comprises:

means for compensating for a repeating part of phase variations of individual clock pulses of said first read-back clock to reduce their effect on the variation in disk speed.

5. The clock generator of claim 4, wherein:

said means for compensating for phase variations includes means for shifting the relative phase of individual clock pulses of one of said reference and said first read-back clock signals.

6. The clock generator of claim 4, wherein said means for compensating comprises:

means for determining average phase errors of individual clock pulses relative to said reference, for determining the difference between said average phase errors and the instantaneous phase error between the individual clock pulses, and for controlling the disk speed using said difference.

7. The clock generator of claim 1, wherein:

said means for writing a first clock track includes means for writing said first index signal between a last clock pulse at an end and a first clock pulse at a beginning of said first clock track;

said means for obtaining information includes means for counting the number of clock pulses in said first read-back clock signal and for measuring time between said last clock pulse and said first clock pulse written in said first clock track; and said means for determining uses the number of clock pulses and the measured time to calculate said first parameter.

8. The clock generator of claim 1, wherein:

said first parameter is used to simultaneously provide said count closure and phase closure in said second clock track.

9. The clock generator of claim 1, wherein:

said means for generating said second clock signal uses said first parameter to adjust the time between a last clock pulse and a first clock pulse in said second clock signal to provide phase closure in said second clock track.

10. The clock generator of claim 1, wherein said means for producing said controlled oscillator signal comprises:

a frequency source for providing a clock signal having a frequency that is selectable from a predetermined range of frequencies in response to a command from said means for determining.

11. The clock generator of claim 10, wherein:

said frequency source comprises a voltage controlled oscillator running at an exact multiple of the frequency of said read-back clock signal.

12. The clock generator of claim 10, wherein:

said means for determining determines a second parameter; and said frequency source comprises a voltage controlled oscillator having a programmable divider for dividing the frequency of said first read-back clock signal by said first parameter to phase lock said voltage controlled oscillator to said first alternating signal of said first read-back clock signal and for dividing said first read-back clock signal by said second parameter to phase lock said voltage controlled oscillator to said first index signal of said first read-back clock signal.

13. The clock generator of claim 12, wherein:

said programmable divider switches between said first and second parameters in response to said means for reading said first clock track sensing said first index signal in said first clock track.

14. The clock generator of claim 10, wherein:

said frequency source comprises a voltage controlled oscillator and a numerically controlled oscillator for providing count and phase closure in said second clock signal.

15. The clock generator of claim 1, wherein:

clock tracks written on said disk are only said first and second clock tracks.

16. The clock generator of claim 1, wherein:

said means for writing a second clock track and said means for writing a first clock track include at least one read-write head.

17. The clock generator of claim 1, wherein:

said means for writing a first clock track includes a first read-write head; and said means for writing a second clock track includes a second read-write head, wherein said first read-write head is different from said second read-write head.

18. A method for generating an accurate clock track along a rotating disk, comprising the steps of:

writing a first clock track along a disk using a first clock signal having a first alternating signal and a first index signal related to a DC erased gap having an end;

reading said first clock track to provide a first readback clock signal including one pulse that is adjacent to said end of said DC erased gap;

obtaining information from said first read-back clock signal;

producing a controlled oscillator signal phase locked to said first alternating signal;

outputting a controlled oscillator feedback signal having one pulse that is adjacent to said end of said DC erased gap;

generating a second clock signal having a frequency from said controlled oscillator signal;

determining, from the obtained information, a first parameter to minimize the time difference between said one pulse of said read-back clock signal and said one pulse of said controlled oscillator feedback signal, said first parameter being determined independently of said frequency of said second clock signal;

and writing said second clock track on the disk using said second clock signal to obtain count closure and in which said first parameter is determined before said second clock track having said count closure is written using said second clock signal.

19. The method of claim 18, wherein said step of determining is used to simultaneously provide said count closure and phase closure.

20. The method of claim 18, further comprising the step of:

regulating the speed of the disk relative to a clock signal recorded on the disk to reduce the variation in the disk speed during at least one of said step of writing a first clock track and said step of writing said second clock track.

21. The method of claim 18, wherein:

said step of writing a first clock track includes writing a series of clock pulses separated by said index signal; and said step of obtaining information includes determining the number of clock pulses and the period length of said index signal recorded on the first clock track.

* * * * *